United States Patent
Lee et al.

(10) Patent No.: US 11,091,621 B2
(45) Date of Patent: Aug. 17, 2021

(54) THERMOPLASTIC RESIN COMPOSITION AND ARTICLE PRODUCED THEREFROM

(71) Applicant: LOTTE ADVANCED MATERIALS CO., LTD., Yeosu-si (KR)

(72) Inventors: Jin Seong Lee, Uiwang-si (KR); Gi Sun Kim, Uiwang-si (KR); Hyun Ji Oh, Uiwang-si (KR); Young Chul Kwon, Uiwang-si (KR); Hyun Taek Jeong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 168 days.

(21) Appl. No.: 16/410,251

(22) Filed: May 13, 2019

(65) Prior Publication Data
US 2019/0359812 A1 Nov. 28, 2019

(30) Foreign Application Priority Data
May 25, 2018 (KR) .......................... 10-2018-0059337

(51) Int. Cl.
*C08L 25/12* (2006.01)
*C08L 69/00* (2006.01)

(52) U.S. Cl.
CPC .............. *C08L 25/12* (2013.01); *C08L 69/00* (2013.01); *C08L 2201/02* (2013.01); *C08L 2201/08* (2013.01); *C08L 2205/035* (2013.01)

(58) Field of Classification Search
CPC . C08L 69/00; C08L 2201/02; C08L 2205/035
See application file for complete search history.

(56) References Cited

U.S. PATENT DOCUMENTS

| 5,674,924 A | 10/1997 | Lee et al. |
| 2013/0168619 A1* | 7/2013 | Lee .......................... C08L 69/00 252/601 |
| 2013/0289179 A1 | 10/2013 | Chin et al. |
| 2015/0183986 A1 | 7/2015 | Kim et al. |

FOREIGN PATENT DOCUMENTS

| CN | 103183899 A | 7/2013 |
| CN | 104744914 A | 7/2015 |
| KR | 0150766 B1 | 10/1998 |
| WO | 2013/112018 A1 | 8/2013 |
| WO | 2015/064859 A1 | 5/2015 |
| WO | 2018/083975 A1 | 5/2018 |

OTHER PUBLICATIONS

Machine translation of WO2015064859 (Year: 2015).*
Extended European Search Report in counterpart European Application No. 19175599.0 dated Jul. 15, 2019, pp. 1-5.
Office Action in counterpart Chinese Application No. 201910433301.6 dated Feb. 26, 2021, pp. 1-6.

* cited by examiner

*Primary Examiner* — Wenwen Cai
(74) *Attorney, Agent, or Firm* — Additon, Pendleton & Witherspoon, P.A.

(57) ABSTRACT

A thermoplastic resin composition includes: about 100 parts by weight of a thermoplastic resin including about 35 wt % to about 55 wt % of a polycarbonate resin, about 3 wt % to about 9 wt % of a first rubber-modified aromatic vinyl graft copolymer, about 7 wt % to about 13 wt % of a second rubber-modified aromatic vinyl graft copolymer, and about 30 wt % to about 50 wt % of an aromatic vinyl copolymer resin; about 6 to about 13 parts by weight of a halogen compound; and about 8 to about 17 parts by weight of a phosphoric ester compound. The first rubber-modified aromatic vinyl graft copolymer is obtained by graft copolymerization of an alkyl(meth)acrylate, an aromatic vinyl monomer and a copolymerizable monomer to a rubber polymer, and the second rubber-modified aromatic vinyl graft copolymer is obtained by graft copolymerization of an aromatic vinyl monomer and a copolymerizable monomer to a rubber polymer.

12 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application 10-2018-0059337, filed on May 25, 2018, the entire disclosure of which is incorporated herein by reference.

FIELD

The present disclosure relates to a thermoplastic resin composition and a molded article produced therefrom.

BACKGROUND

A rubber-modified aromatic vinyl copolymer resin has good properties in terms of impact resistance, processability, external appearance and the like, and is broadly applied to interior/exterior materials for electric/electronic products, and the like. However, since the rubber-modified aromatic vinyl copolymer resin has low combustion resistance and allows continuous diffusion of fire by assisting in combustion upon ignition of a flame by an external ignition factor, it is important to secure stability against fire.

Typically, flame retardants, such as halogen flame retardants, phosphorus flame retardants, and inorganic flame retardants, alone or in combination with a flame retardant aid, are added to a rubber-modified aromatic vinyl copolymer resin to impart flame retardancy to the resin. Specifically, a halogen compound and an antimony compound may be added together. For example, a mixture of a halogen compound and an antimony compound can be added to an acrylonitrile/butadiene/styrene (ABS) resin to impart flame retardancy.

However, the use of antimony trioxide or the like as the antimony compound can limit colorability due to deterioration in coloring properties of the resin composition. In particular, it is difficult to realize a black color. Further, the use of the antimony compound causes severe discoloration and gas generation at a high injection temperature due to reaction with a halogen flame retardant.

When the antimony compound is not used, the same degree of flame retardancy can be obtained only when the halogen flame retardant is used in an amount of about 2 to 3 times that of the mixture of the halogen flame retardant and the antimony compound. However, an excess of the halogen compound (flame retardant) causes deterioration in mechanical properties of the resin composition, such as impact strength, tensile strength and flexural strength, and in thermal properties thereof, such as heat resistance and heat deflection temperature, thereby making it difficult to apply the resin composition to electric/electronic products.

As another method, a polycarbonate resin and a phosphorous compound, which are likely to form char, can be mixed with a rubber-modified aromatic vinyl copolymer resin to impart flame retardancy to the rubber-modified aromatic vinyl copolymer resin. In this method, however, the resin composition requires high temperature for injection molding due to deterioration in fluidity and can suffer from deterioration in impact resistance due to decomposition of the resin caused by high temperature injection, phase separation between the polycarbonate and a rubber-modified aromatic vinyl copolymer, and the like.

Therefore, there is a need for a thermoplastic resin composition which can have good properties in terms of impact resistance, flame retardancy, heat resistance, and/or thermal stability, and/or a balance therebetween.

SUMMARY OF THE INVENTION

The present disclosure relates to a thermoplastic resin composition which can have good properties in terms of impact resistance, flame retardancy, heat resistance, thermal stability, formability, and/or eco-friendliness, and/or the like, and a molded article formed of the same.

The thermoplastic resin composition may include: about 100 parts by weight of a thermoplastic resin including about 35 wt % to about 55 wt % of a polycarbonate resin, about 3 wt % to about 9 wt % of a first rubber-modified aromatic vinyl graft copolymer, about 7 wt % to about 13 wt % of a second rubber-modified aromatic vinyl graft copolymer, and about 30 wt % to about 50 wt % of an aromatic vinyl copolymer resin; about 6 to about 13 parts by weight of a halogen compound; and about 8 to about 17 parts by weight of a phosphoric ester compound, wherein the first rubber-modified aromatic vinyl graft copolymer is a quaternary graft copolymer obtained by graft copolymerization of an alkyl(meth)acrylate, an aromatic vinyl monomer and a copolymerizable monomer to a rubber polymer, the second rubber-modified aromatic vinyl graft copolymer is a ternary graft copolymer obtained by graft copolymerization of an aromatic vinyl monomer and a copolymerizable monomer to a rubber polymer, and the first rubber-modified aromatic vinyl graft copolymer and the second rubber-modified aromatic vinyl graft copolymer are present in a weight ratio of about 1:1 to about 1:4.

The aromatic vinyl copolymer resin may be a polymer of a monomer mixture including an aromatic vinyl monomer and a vinyl cyanide monomer.

The halogen compound may include decabromodiphenylethane, decabromodiphenylether, tetrabromobisphenol A, tetrabromobisphenol A-epoxy oligomer, brominated epoxy oligomer, octabromomethylphenyl indene, ethylenebistetrabromophthalimide, and/or 2,4,6-tris(2,4,6-tribromophenoxy)-1,3,5-triazine. The phosphoric ester compound may include a compound represented by Formula 1:

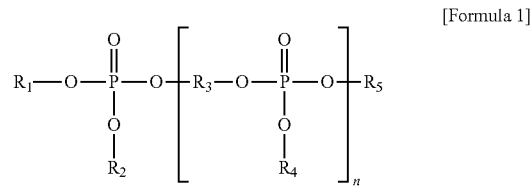

[Formula 1]

wherein $R_1$, $R_2$, $R_4$ and $R_5$ are each independently a hydrogen atom, a $C_6$ to $C_{20}$ aryl group, or a $C_1$ to $C_{10}$ alkyl-substituted $C_6$ to $C_{20}$ aryl group, $R_3$ is a $C_6$ to $C_{20}$ arylene group or a $C_1$ to $C_{10}$ alkyl-substituted $C_6$ to $C_{20}$ arylene group, and n is an integer of 0 to 10.

The halogen compound and the phosphoric ester compound can be present in a weight ratio of about 1:0.8 to about 1:2.

The thermoplastic resin composition may have a notched Izod impact strength of about 22 kgf·cm/cm to about 40 kgf·cm/cm, as measured on a ⅛" thick specimen in accordance with ASTM D256.

The thermoplastic resin composition may have a flame retardancy of V-0 and a flame retardancy of 5 VB, as measured on a 1.5 mm thick specimen and a 2.0 mm thick specimen by a UL-94 vertical test, respectively.

The thermoplastic resin composition may have a Vicat softening temperature of about 90° C. to about 97° C., as measured at a heating rate of 50° C./hr under a load of 5 kgf in accordance with ISO R306.

The thermoplastic resin composition may have a melt-flow index (MI) of about 26 g/10 min to about 40 g/10 min, as measured at 220° C. under a load of 10 kgf in accordance with ASTM D1238.

The present disclosure also relates to a molded article. The molded article may be formed of the thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present disclosure may include (A) a polycarbonate resin; (B) a first rubber-modified aromatic vinyl graft copolymer; (C) a second rubber-modified aromatic vinyl graft copolymer; (D) an aromatic vinyl copolymer resin; (E) a halogen compound; and (F) a phosphoric ester compound.

Herein, "a to b" used to indicate the range of certain values refers to "more than or equal to a (≥a) and less than or equal to b (≤b)".

(A) Polycarbonate Resin

The polycarbonate resin according to embodiments of the present disclosure may include any typical aromatic polycarbonate resin used in typical thermoplastic resin compositions. For example, the polycarbonate resin may be an aromatic polycarbonate resin prepared by reacting a diphenol (aromatic diol compound) with a carbonate precursor, such as phosgene, halogen formate, and/or carbonate diester.

Examples of the diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl) cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and/or 2,2-bis(3,5-dimethyl-4-hydroxyphenyl)propane, and/or the like, and/or combinations and/or mixtures thereof. For example, the diphenols may include 2,2-bis(4-hydroxyphenyl)propane, 2,2-bis(3,5-dichloro-4-hydroxyphenyl)propane, 2,2-bis(3,5-dimethyl-4-hydroxyphenyl)propane, 2,2-bis(3-methyl-4-hydroxyphenyl)propane, and/or 1,1-bis(4-hydroxyphenyl)cyclohexane, for example may include 2,2-bis-(4-hydroxyphenyl)propane, which is also referred to as bisphenol A.

The polycarbonate resin may include a branched polycarbonate resin. For example, the polycarbonate resin may be prepared by adding a tri- or higher polyfunctional compound, for example a tri- or higher valent phenol group-containing compound, in an amount of about 0.05 parts by mole to about 2 parts by mole based on about 100 parts by mole of the diphenols used in polymerization.

The polycarbonate resin may include a homopolycarbonate resin, a copolycarbonate resin, and/or a combination and/or mixture thereof. In addition, the polycarbonate resin may be partly or completely replaced by an aromatic polyester-carbonate resin obtained by polymerization in the presence of an ester precursor, for example, a bifunctional carboxylic acid.

The polycarbonate resin may have a weight average molecular weight (Mw) of about 15,000 g/mol to about 35,000 g/mol, for example, about 20,000 g/mol to about 32,000 g/mol, as measured by gel permeation chromatography (GPC). Within this range, the thermoplastic resin composition can have good fluidity (formability), impact resistance, and/or heat resistance, and/or the like.

The polycarbonate resin may be present in an amount of about 35 wt % to about 55 wt %, for example, about 40 wt % to about 50 wt %, based on 100 wt % of a thermoplastic resin including the polycarbonate resin, the first and second rubber-modified aromatic vinyl copolymers, and the aromatic vinyl copolymer resin. In some embodiments, the thermoplastic resin including the polycarbonate resin, the first and second rubber-modified aromatic vinyl copolymers, and the aromatic vinyl copolymer resin can include the polycarbonate resin in an amount of about 35, 36, 37, 38, 39, 40, 41, 42, 43, 44, 45, 46, 47, 48, 49, 50, 51, 52, 53, 54, or 55 wt % based on 100 wt % of the thermoplastic resin including the polycarbonate resin, the first and second rubber-modified aromatic vinyl copolymers, and the aromatic vinyl copolymer resin. Further, according to some embodiments, the polycarbonate resin may be present in an amount of from about any of the foregoing amounts to about any other of the foregoing amounts.

If the content of the polycarbonate resin is less than about 35 wt %, the thermoplastic resin composition (molded article) can suffer from deterioration in impact resistance and/or heat resistance, and/or the like, and if the content of the polycarbonate resin exceeds about 55 wt %, the thermoplastic resin composition (molded article) can suffer from deterioration in flame retardancy.

(B) First Rubber-Modified Aromatic Vinyl Graft Copolymer

The first rubber-modified aromatic vinyl graft copolymer according to embodiments of the present disclosure is used together with the second rubber-modified aromatic vinyl graft copolymer to improve impact resistance and/or flame retardancy and/or a balance therebetween of the thermoplastic resin composition (molded article) and is a quaternary graft copolymer obtained by graft copolymerization of a mixture of an alkyl(meth)acrylate, an aromatic vinyl monomer and a copolymerizable monomer to a rubber polymer. For example, the first rubber-modified aromatic vinyl graft copolymer may be obtained through graft copolymerization of the monomer mixture including the alkyl(meth)acrylate, the aromatic vinyl monomer and the copolymerizable monomer to the rubber polymer. Here, polymerization may be carried out by any known polymerization method, such as emulsion polymerization, suspension polymerization, bulk polymerization, and the like.

Examples of the rubber polymer may include without limitation diene rubbers, such as polybutadiene, poly(styrene-butadiene), and/or poly(acrylonitrile-butadiene); saturated rubbers obtained by adding hydrogen to the diene rubbers; isoprene rubbers; acrylic rubbers, such as poly (butyl acrylate); and/or ethylene-propylene-diene monomer terpolymers (EPDM). These may be used alone or as a combination and/or mixture thereof. For example, the rubber polymer may include a diene rubber, such as a polybutadiene rubber.

In addition, the rubber polymer (rubber particles) may have an average particle diameter (particle size) of about 100 nm to about 400 nm, for example, about 150 nm to about 350 nm. Within this range, the thermoplastic resin composition (molded article) can have good properties in terms of mechanical properties and/or formability (flowability), and/or the like. Here, the average particle diameter (z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co. Ltd., nano-zs).

The rubber polymer may be present in an amount of about 35 wt % to about 70 wt %, for example, about 40 wt % to about 65 wt %, based on 100 wt % of the first rubber-modified aromatic vinyl graft copolymer. In some embodiments, the first rubber-modified aromatic vinyl graft copolymer can include the rubber polymer in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % based on 100 wt % of the first rubber-modified aromatic vinyl graft copolymer. Further, according to some embodiments, the rubber polymer may be present in an amount of from about any of the foregoing amounts to about any other of the foregoing amounts.

Within this range, the thermoplastic resin composition (molded article) can have good properties in terms of mechanical properties and/or formability, and/or the like.

The alkyl(meth)acrylate may be graft copolymerizable with the rubber polymer and/or may be copolymerizable with an aromatic vinyl monomer, and may be a $C_1$ to $C_{10}$ alkyl group-containing alkyl(meth)acrylate. Examples of the alkyl(meth)acrylate can include without limitation methyl (meth)acrylate, ethyl(meth)acrylate, propyl(meth)acrylate, and/or butyl(meth)acrylate, and/or the like, and/or combinations and/or mixtures thereof. In some embodiments, methyl methacrylate and/or methyl acrylate may be used.

The alkyl(meth)acrylate may be present in an amount of about 15 wt % to about 50 wt %, for example, about 20 wt % to about 40 wt %, based on 100 wt % of the first rubber-modified aromatic vinyl graft copolymer. In some embodiments, the first rubber-modified aromatic vinyl graft copolymer can include the alkyl(meth)acrylate in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on 100 wt % of the first rubber-modified aromatic vinyl graft copolymer. Further, according to some embodiments, the alkyl(meth)acrylate may be present in an amount of from about any of the foregoing amounts to about any other of the foregoing amounts.

Within this range, the thermoplastic resin composition (molded article) can have good properties in terms of mechanical properties, flame retardancy, and/or formability, and/or the like.

The aromatic vinyl monomer may be graft copolymerizable with the rubber polymer. Examples of the aromatic vinyl monomer can include without limitation styrene, α-methylstyrene, β-methylstyrene, p-methyl styrene, p-t-butylstyrene, ethyl styrene, vinylxylene, monochlorostyrene, dichlorostyrene, dibromostyrene, and/or vinyl naphthalene, and/or the like and/or combinations and/or mixtures thereof. For example, the aromatic vinyl monomer may include styrene.

The aromatic vinyl monomer may be present in an amount of about 2 wt % to about 30 wt %, for example, about 5 wt % to about 20 wt %, based on 100 wt % of the first rubber-modified aromatic vinyl graft copolymer. In some embodiments, the first rubber-modified aromatic vinyl graft copolymer can include the aromatic vinyl monomer in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % based on 100 wt % of the first rubber-modified aromatic vinyl graft copolymer. Further, according to some embodiments, the aromatic vinyl monomer may be present in an amount of from about any of the foregoing amounts to about any other of the foregoing amounts.

Within this range, the thermoplastic resin composition (molded article) can have good properties in terms of mechanical properties and/or formability, and/or the like.

Examples of the copolymerizable monomer may include without limitation a vinyl cyanide monomer, such as acrylonitrile, methacrylonitrile, ethacrylonitrile, phenyl acrylonitrile, α-chloroacrylonitrile, and/or fumaronitrile, and/or the like; a monomer for imparting processability and/or thermal resistance, such as acrylic acid, methacrylic acid, maleic anhydride, and/or N-substituted maleimide, and/or the like; and/or the like; and/or combinations and/or mixtures thereof. For example, the copolymerizable monomer may include a vinyl cyanide monomer, such as acrylonitrile.

The copolymerizable monomer may be present in an amount of about 1 wt % to about 20 wt %, for example, about 1 wt % to about 15 wt %, based on 100 wt % of the first rubber-modified aromatic vinyl graft copolymer. In some embodiments, the first rubber-modified aromatic vinyl graft copolymer can include the copolymerizable monomer in an amount of about 1, 2, 3, 4, 5, 6, 7, 8, 9, 10, 11, 12, 13, 14, 15, 16, 17, 18, 19, or 20 wt % based on 100 wt % of the first rubber-modified aromatic vinyl graft copolymer. Further, according to some embodiments, the copolymerizable monomer may be present in an amount of from about any of the foregoing amounts to about any other of the foregoing amounts.

Within this range, the thermoplastic resin composition (molded article) can have good properties in terms of mechanical properties and/or formability, and/or the like.

The first rubber-modified aromatic vinyl graft copolymer may be present in an amount of about 3 wt % to about 9 wt %, for example, about 4 wt % to about 8 wt %, based on 100 wt % of the thermoplastic resin including the polycarbonate resin, the first and second rubber-modified aromatic vinyl copolymers, and the aromatic vinyl copolymer resin. In some embodiments, the thermoplastic resin including the polycarbonate resin, the first and second rubber-modified aromatic vinyl copolymers, and the aromatic vinyl copolymer resin can include the first rubber-modified aromatic vinyl graft copolymer in an amount of about 3, 4, 5, 6, 7, 8, or 9 wt % based on 100 wt % of the thermoplastic resin including the polycarbonate resin, the first and second rubber-modified aromatic vinyl copolymers, and the aromatic vinyl copolymer resin. Further, according to some embodiments, the first rubber-modified aromatic vinyl graft copolymer may be present in an amount of from about any of the foregoing amounts to about any other of the foregoing amounts.

If the content of the first rubber-modified aromatic vinyl graft copolymer is less than about 3 wt %, the thermoplastic resin composition (molded article) can suffer from deterioration in impact resistance, and if the content of the first rubber-modified aromatic vinyl graft copolymer exceeds about 9 wt %, the thermoplastic resin composition (molded article) can suffer from deterioration in flame retardancy, thermal stability, and/or fluidity, and/or the like.

(C) Second Rubber-Modified Aromatic Vinyl Graft Copolymer

The second rubber-modified aromatic vinyl graft copolymer according to embodiments of the present disclosure is used together with the first rubber-modified aromatic vinyl graft copolymer to improve impact resistance and/or flame retardancy and/or a balance therebetween of the thermoplastic resin composition (molded article) and is a ternary graft copolymer obtained by graft copolymerization of an aromatic vinyl monomer and a copolymerizable monomer to a rubber polymer. For example, the second rubber-modified aromatic vinyl graft copolymer may be obtained through graft copolymerization of a monomer mixture including the aromatic vinyl monomer and the copolymerizable monomer to the rubber polymer. Here, polymerization may be carried out by any known polymerization method, such as emulsion polymerization, suspension polymerization, bulk polymerization, and the like.

Examples of the rubber polymer may include without limitation diene rubbers, such as polybutadiene, poly(styrene-butadiene), and/or poly(acrylonitrile-butadiene); saturated rubbers obtained by adding hydrogen to the diene rubbers; isoprene rubbers; acrylic rubbers, such as poly(butyl acrylate); and/or ethylene-propylene-diene monomer terpolymers (EPDM). These may be used alone and/or as a combination and/or mixture thereof. For example, the rubber polymer may include a diene rubber, such as a polybutadiene rubber.

In addition, the rubber polymer (rubber particles) may have an average particle diameter (particle size) of about 100 nm to about 400 nm, for example, about 150 nm to about 350 nm. Within this range, the thermoplastic resin composition (molded article) can have good properties in terms of mechanical properties, and/or formability, and/or the like. Here, the average particle diameter (z-average) of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co. Ltd., nano-zs).

The rubber polymer may be present in an amount of about 35 wt % to about 70 wt %, for example, about 40 wt % to about 65 wt %, based on 100 wt % of the second rubber-modified aromatic vinyl graft copolymer. In some embodiments, the second rubber-modified aromatic vinyl graft copolymer can include the rubber polymer in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % based on 100 wt % of the second rubber-modified aromatic vinyl graft copolymer. Further, according to some embodiments, the rubber polymer may be present in an amount of from about any of the foregoing amounts to about any other of the foregoing amounts.

Within this range, the thermoplastic resin composition (molded article) can have good properties in terms of mechanical properties and/or formability, and/or the like.

The aromatic vinyl monomer may be graft copolymerizable with the rubber polymer. Examples of the aromatic vinyl monomer can include without limitation styrene, α-methylstyrene, β-methyl styrene, p-methyl styrene, p-t-butylstyrene, ethyl styrene, vinylxylene, monochlorostyrene, dichlorostyrene, dibromostyrene, and/or vinyl naphthalene, and/or the like, and/or combinations and/or mixtures thereof. For example, the aromatic vinyl monomer may include styrene.

The aromatic vinyl monomer may be present in an amount of about 15 wt % to about 50 wt %, for example, about 20 wt % to about 45 wt %, based on 100 wt % of the second rubber-modified aromatic vinyl graft copolymer. In some embodiments, the second rubber-modified aromatic vinyl graft copolymer can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % based on 100 wt % of the second rubber-modified aromatic vinyl graft copolymer. Further, according to some embodiments, the aromatic vinyl monomer may be present in an amount of from about any of the foregoing amounts to about any other of the foregoing amounts.

Within this range, the thermoplastic resin composition (molded article) can have good properties in terms of mechanical properties and/or formability, and/or the like.

Examples of the copolymerizable monomer may include without limitation vinyl cyanide monomers, such as acrylonitrile, methacrylonitrile, ethacrylonitrile, phenyl acrylonitrile, α-chloroacrylonitrile, and/or fumaronitrile, and/or the like; monomers for imparting processability and/or thermal resistance, such as acrylic acid, methacrylic acid, maleic anhydride, and/or N-substituted maleimide, and/or the like; and/or the like; and/or combinations and/or mixtures thereof. For example, the copolymerizable monomer may include a vinyl cyanide monomer, such as acrylonitrile.

The copolymerizable monomer may be present in an amount of about 2 wt % to about 25 wt %, for example, about 5 wt % to about 20 wt %, based on 100 wt % of the second rubber-modified aromatic vinyl graft copolymer. In some embodiments, the second rubber-modified aromatic vinyl graft copolymer can include the copolymerizable monomer in an amount of about 2, 3, 4, 5, 6, 7, 8, 9, 10, 11, 12, 13, 14, 15, 16, 17, 18, 19, 20, 21, 22, 23, 24, or 25 wt % based on 100 wt % of the second rubber-modified aromatic vinyl graft copolymer. Further, according to some embodiments, the copolymerizable monomer may be present in an amount of from about any of the foregoing amounts to about any other of the foregoing amounts.

Within this range, the thermoplastic resin composition (molded article) can have good properties in terms of mechanical properties and/or formability, and/or the like.

The second rubber-modified aromatic vinyl graft copolymer may be present in an amount of about 7 to about 13 wt %, for example, about 8 wt % to about 12 wt %, based on 100 wt % of the thermoplastic resin including the polycarbonate resin, the first and second rubber-modified aromatic vinyl copolymers, and the aromatic vinyl copolymer resin. In some embodiments, the thermoplastic resin including the polycarbonate resin, the first and second rubber-modified aromatic vinyl copolymers, and the aromatic vinyl copolymer resin can include the second rubber-modified aromatic vinyl graft copolymer in an amount of about 7, 8, 9, 10, 11, 12, or 13 wt % based on 100 wt % of the thermoplastic resin including the polycarbonate resin, the first and second rubber-modified aromatic vinyl copolymers, and the aromatic vinyl copolymer resin. Further, according to some embodiments, the second rubber-modified aromatic vinyl graft copolymer may be present in an amount of from about any of the foregoing amounts to about any other of the foregoing amounts.

If the content of the second rubber-modified aromatic vinyl graft copolymer is less than about 7 wt %, the thermoplastic resin composition (molded article) can suffer from deterioration in impact resistance and/or the like, and if the content of the second rubber-modified aromatic vinyl graft copolymer exceeds about 13 wt %, the thermoplastic resin composition (molded article) can suffer from deterioration in heat resistance and/or fluidity, and/or the like.

The first rubber-modified aromatic vinyl graft copolymer (B) and the second rubber-modified aromatic vinyl graft copolymer (C) may be present in a weight ratio ((B):(C)) of about 1:1 to about 1:4, for example, about 1:1 to about 1:3. If the weight ratio ((B):(C)) is less than about 1:1, the thermoplastic resin composition (molded article) can suffer from deterioration in impact resistance and/or flame retardancy, and/or the like, and if the weight ratio ((B):(C)) exceeds about 1:4, the thermoplastic resin composition (molded article) can suffer from deterioration in impact resistance and/or the like.

(D) Aromatic Vinyl Copolymer Resin

The aromatic vinyl copolymer resin according to embodiments of the present disclosure serves to improve formability (fluidity) and/or mechanical properties (rigidity and/or the like) of the thermoplastic resin composition (molded article), and is a copolymer of a monomer mixture including an aromatic vinyl monomer and a vinyl cyanide monomer. For example, the aromatic vinyl copolymer resin may be a copolymer including a repeat unit derived from the aromatic vinyl monomer and a repeat unit derived from the vinyl cyanide monomer, and may be obtained by any typical polymerization method known in the art. The aromatic vinyl copolymer resin may further include a repeat unit derived from a monomer for imparting processability and/or heat resistance by further adding the monomer for imparting processability and/or heat resistance to the monomer mixture, as needed.

The aromatic vinyl monomer may be copolymerizable with a vinyl cyanide monomer to form a repeat unit derived from the aromatic vinyl monomer. Examples of the aromatic vinyl monomer may include without limitation styrene, α-methylstyrene, β-methyl styrene, p-methyl styrene, p-t-butyl styrene, ethyl styrene, vinylxylene, monochlorostyrene, dichlorostyrene, dibromostyrene, and/or vinyl naphthalene, and/or the like. These may be used alone and/or as a combination and/or mixture thereof.

The aromatic vinyl monomer (repeat unit derived from the aromatic vinyl monomer) may be present in an amount of about 40 wt % to about 90 wt %, for example, about 55 wt % to about 85 wt %, based on the 100 wt % of the monomer mixture of the aromatic vinyl monomer and the vinyl cyanide monomer (used to make the aromatic vinyl copolymer resin). In some embodiments, the monomer mixture used to make the aromatic vinyl copolymer resin can include the aromatic vinyl monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the monomer mixture. Further, according to some embodiments, the aromatic vinyl monomer may be present in an amount of from about any of the foregoing amounts to about any other of the foregoing amounts.

Within this range, the thermoplastic resin composition (molded article) can exhibit good fluidity (formability) and/or the like.

The vinyl cyanide monomer may be copolymerizable with an aromatic vinyl monomer to form a repeat unit derived from the vinyl cyanide monomer. Examples of the vinyl cyanide monomer may include acrylonitrile, methacrylonitrile, ethacrylonitrile, phenyl acrylonitrile, α-chloroacrylonitrile, and/or fumaronitrile, without being limited thereto. These may be used alone and/or as a combination and/or mixture thereof. For example, the vinyl cyanide monomer may include acrylonitrile and/or methacrylonitrile, and/or the like.

The vinyl cyanide monomer (repeat unit derived from the vinyl cyanide monomer) may be present in an amount of about 10 wt % to about 60 wt %, for example, about 15 wt % to about 45 wt %, based on 100 wt % of the monomer mixture of the aromatic vinyl monomer and the vinyl cyanide monomer (used to make the aromatic vinyl copolymer resin). In some embodiments, the monomer mixture used to make the aromatic vinyl copolymer resin can include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % based on 100 wt % of the monomer mixture. Further, according to some embodiments, the vinyl cyanide monomer may be present in an amount of from about any of the foregoing amounts to about any other of the foregoing amounts. Within this range, the thermoplastic resin composition (molded article) can exhibit good compatibility.

Examples of the monomer for imparting processability and/or heat resistance may include acrylic acid, methacrylic acid, maleic anhydride, and/or N-substituted maleimide, without being limited thereto. These may be used alone or as a combination and/or mixture thereof.

The monomer for imparting processability and/or heat resistance may be used in an amount of about 30 parts by weight or less, for example, about 1 to about 25 parts by weight, based on about 100 parts by weight of the monomer mixture of the aromatic vinyl monomer and the vinyl cyanide monomer. In some embodiments, the monomer mixture can include the monomer for imparting processability and/or heat resistance in an amount of 0 (the monomer for imparting processability and/or heat resistance is not present), about 0 (the monomer for imparting processability and/or heat resistance is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight based on about 100 parts by weight of the monomer mixture. Further, according to some embodiments, the monomer for imparting processability and/or heat resistance may be present in an amount of from about any of the foregoing amounts to about any other of the foregoing amounts. Within this range, the monomer for imparting processability and/or heat resistance can further impart processability and/or heat resistance to the thermoplastic resin composition with minimal or no deterioration in other properties thereof.

The aromatic vinyl copolymer resin may include a copolymer of styrene and acrylonitrile.

The aromatic vinyl copolymer resin may have a weight average molecular weight of about 50,000 g/mol to about 300,000 g/mol, for example, about 90,000 g/mol to about 250,000 g/mol, as measured by gel permeation chromatography (GPC). Within this range, the thermoplastic resin composition (molded article) can exhibit good properties in terms of fluidity (formability) and/or the like.

The aromatic vinyl copolymer resin may be present in an amount of about 30 wt % to about 50 wt %, for example, about 32 wt % to about 44 wt %, based on 100 wt % of the thermoplastic resin including the polycarbonate resin, the first and second rubber-modified aromatic vinyl copolymers, and the aromatic vinyl copolymer resin. In some embodiments, the thermoplastic resin including the polycarbonate resin, the first and second rubber-modified aromatic vinyl copolymers, and the aromatic vinyl copolymer resin can include the aromatic vinyl copolymer resin in an amount of about 30, 31, 32, 33, 34, 35, 36, 37, 38, 39, 40, 41, 42, 43, 44, 45, 46, 47, 48, 49, or 50 wt % based on 100 wt % of the thermoplastic resin including the polycarbonate resin, the first and second rubber-modified aromatic vinyl copolymers, and the aromatic vinyl copolymer resin. Further, according to some embodiments, the aromatic vinyl copolymer resin may be present in an amount of from about any of the foregoing amounts to about any other of the foregoing amounts.

If the content of the aromatic vinyl copolymer resin is less than about 30 wt %, the thermoplastic resin composition (molded article) can suffer from deterioration in fluidity, and/or the like, and if the content of the aromatic vinyl copolymer resin exceeds about 50 wt %, the thermoplastic resin composition (molded article) can suffer from deterioration in impact resistance and/or rigidity, and/or the like.

(E) Halogen Compound

The halogen compound according to embodiments of the present disclosure serves to improve flame retardancy of the thermoplastic resin composition (molded article) with minimal or no deterioration in impact resistance and/or the like, and may be a halogen retardant applicable to a typical thermoplastic resin composition. For example, the halogen compound may be a bromine compound and/or a chlorine compound, and/or the like.

Examples of the halogen compound may include without limitation decabromodiphenylethane, decabromodiphenylether, tetrabromobisphenol A, tetrabromobisphenol A-epoxy oligomer, brominated epoxy oligomer, octabromomethylphenyl indene, ethylenebistetrabromophthalimide, and/or 2,4,6-tris(2,4,6-tribromophenoxy)-1,3,5-triazine, and/or the like, and/or combinations and/or mixtures thereof.

The halogen compound may be present in an amount of about 6 to about 13 parts by weight, for example, about 8 to about 11 parts by weight, relative to about 100 parts by weight of the thermoplastic resin including the polycarbonate resin, the first and second rubber-modified aromatic vinyl copolymers, and the aromatic vinyl copolymer resin. In some embodiments, the thermoplastic resin composition can include the halogen compound in an amount of about 6, 7, 8, 9, 10, 11, 12, or 13 parts by weight based on about 100 parts by weight of the thermoplastic resin including the polycarbonate resin, the first and second rubber-modified aromatic vinyl copolymers, and the aromatic vinyl copolymer resin. Further, according to some embodiments, the halogen compound may be present in an amount of from about any of the foregoing amounts to about any other of the foregoing amounts.

If the content of the halogen compound is less than about 6 parts by weight, the thermoplastic resin composition (molded article) can suffer from deterioration in flame retardancy, and/or the like, and if the content of the halogen compound exceeds about 13 parts by weight, the thermoplastic resin composition (molded article) can suffer from deterioration in impact resistance and/or heat resistance, and/or the like.

(F) Phosphoric Ester Compound

The phosphoric ester compound according to embodiments of the present disclosure serves to improve flame retardancy with minimal or no deterioration in impact resistance of the thermoplastic resin composition (molded article), and may be an aromatic phosphoric ester retardant used in a typical thermoplastic resin composition.

The phosphoric ester compound may include a phosphoric ester compound (phosphate compound) represented by Formula 1:

[Formula 1]

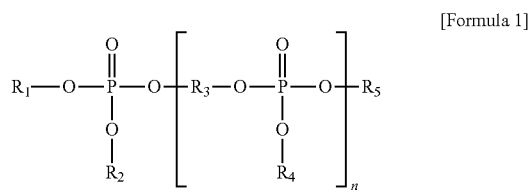

wherein, in Formula 1, $R_1$, $R_2$, $R_4$ and $R_5$ are each independently a hydrogen atom, a $C_6$ to $C_{20}$ aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer from 0 to 10, for example, 0 to 4.

When n is 0 in Formula 1, examples of the aromatic phosphoric ester compound may include without limitation a diaryl phosphate, such as diphenyl phosphate, triphenyl phosphate, tricresyl phosphate, trixylenyl phosphate, tri(2,6-dimethylphenyl)phosphate, tri(2,4,6-trimethylphenyl) phosphate, tri(2,4-di-tert-butylphenyl)phosphate, and/or tri (2,6-dimethylphenyl)phosphate. In addition, when n is 1 in Formula 1, examples of the aromatic phosphoric ester compound may include without limitation bisphenol-A, bis (diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], and/or hydroquinone bis[bis(2,4-di-tert-butylphenyl)phosphate], and when n is 2 or more in Formula 1, examples of the aromatic phosphoric ester compound may include an oligomer type phosphoric ester compound, without being limited thereto. These compounds may be used alone or as a combination and/or mixture thereof.

The phosphoric ester compound may be present in an amount of about 8 to about 17 parts by weight, for example, about 10 to about 15 parts by weight, relative to about 100 parts by weight of the thermoplastic resin including the polycarbonate resin, the first and second rubber-modified aromatic vinyl copolymers, and the aromatic vinyl copolymer resin. In some embodiments, the thermoplastic resin composition can include the phosphoric ester compound in an amount of about 8, 9, 10, 11, 12, 13, 14, 15, 16, or 17 parts by weight based on about 100 parts by weight of the thermoplastic resin including the polycarbonate resin, the first and second rubber-modified aromatic vinyl copolymers, and the aromatic vinyl copolymer resin. Further, according to some embodiments, the phosphoric ester compound may be present in an amount of from about any of the foregoing amounts to about any other of the foregoing amounts.

If the content of the phosphoric ester compound is less than about 8 parts by weight, the thermoplastic resin composition (molded article) can suffer from deterioration in flame retardancy, and if the content of the phosphoric ester compound exceeds about 17 parts by weight, the thermoplastic resin composition (molded article) can suffer from deterioration in heat resistance and/or fluidity.

In some embodiments, the halogen compound (E) and the phosphoric ester compound (F) may be present in a weight ratio ((E):(F)) of about 1:0.8 to about 1:2, for example, about 1:0.9 to about 1:1.9. Within this range, the thermoplastic resin composition (molded article) can exhibit good properties in terms of impact resistance and/or flame retardancy, and/or a balance therebetween.

The thermoplastic resin composition according to embodiments of the present disclosure may further include one or more additives, such as inorganic fillers, a compatibilizer, a release agent, a lubricant, a plasticizer, a heat stabilizer, a photostabilizer, an anti-dripping agent, an antioxidant, a pigment, and/or a dye, and/or combinations and/or mixtures thereof.

The additive may be present in an amount of about 0.01 to about 40 parts by weight relative to about 100 parts by weight of the thermoplastic resin including the polycarbonate resin, the first and second rubber-modified aromatic vinyl copolymers, and the aromatic vinyl copolymer resin, without being limited thereto. In some embodiments, the thermoplastic resin composition can include an additive in an amount of 0 (an additive is not present), about 0 (an additive is present), 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight based on about 100 parts by weight of the thermoplastic resin including the polycarbonate resin, the first and second rubber-modified aromatic vinyl copolymers, and the aromatic vinyl copolymer resin. Further, according to some embodiments, an additive may be present in an amount of from about any of the foregoing amounts to about any other of the foregoing amounts.

The thermoplastic resin composition according to embodiments of the present disclosure may be prepared in pellet form by mixing the aforementioned components, followed by melt extrusion at about 200° C. to about 300° C., for example, about 250° C. to about 280° C., using a typical twin-screw extruder.

The thermoplastic resin composition may have a notched Izod impact strength of about 22 kgf·cm/cm to about 40 kgf·cm/cm, for example, about 25 kgf·cm/cm to about 36 kgf·cm/cm, as measured on a ⅛" thick specimen in accordance with ASTM D256. The thermoplastic resin composition may have a flame retardancy of V0, as measured on a 1.5 mm thick specimen in accordance with the UL94 standard, and a flame retardancy of 5 VB, as measured on a 2.0 mm thick specimen in accordance with the UL94 standard.

The thermoplastic resin composition may have a Vicat softening temperature of about 90° C. to about 97° C., for example, about 90° C. to about 96° C., as measured under a load of 5 kgf at 50° C./hr in accordance with ISO R306.

The thermoplastic resin composition may have a melt flow index (MI) of about 26 g/10 min to about 40 g/10 min, for example, about 27.5 g/10 min to about 38.5 g/10 min, as measured at 220° C. under a load of 10 kgf in accordance with ASTM D1238.

A molded article according to the present disclosure is formed from the thermoplastic resin composition. The thermoplastic resin composition may be prepared in pellet form. Then, the prepared pellets may be formed into various molded articles through various molding methods, such as injection molding, extrusion molding, vacuum molding, casting, and the like. Such a molding method is well-known to those skilled in the art.

The thermoplastic resin composition and the molded article according to the present disclosure may be produced using particular amounts of the first and second rubber-modified aromatic vinyl graft copolymers in a particular weight ratio, thereby enabling improvement in impact resistance and other properties with small amounts of the rubber-modified aromatic vinyl graft copolymers. With the small amounts of the first and second rubber-modified aromatic vinyl graft copolymers, the thermoplastic resin composition can have improved flame retardancy, thereby improving thermal stability. As such, the molded article can exhibit good properties in terms of impact resistance, flame retardancy, heat resistance, thermal stability, and/or formability (fluidity), and/or a balance therebetween, and can be advantageously used as exterior materials for electric and/or electronic products.

Next, the present invention will be described in more detail with reference to the following examples. It should be understood that these examples are provided for illustration only and are not to be in any way construed as limiting the present invention.

EXAMPLE

Details of components used in Examples and Comparative Examples are as follows:

(A) Polycarbonate Resin

A bisphenol-A polycarbonate resin having a weight average molecular weight (Mw) of 22,000 g/mol (Lotte Advanced Materials) is used.

(B) First Rubber-Modified Aromatic Vinyl Graft Copolymer

A methyl methacrylate-acrylonitrile-butadiene-styrene graft copolymer (g-MABS) prepared by grafting a mixture of 28 wt % of methyl methacrylate, 8 wt % of styrene and 4 wt % of acrylonitrile to 60 wt % of a polybutadiene rubber having an average particle diameter of 250 nm is used.

(C) Second Rubber-Modified Aromatic Vinyl Graft Copolymer

An acrylonitrile-butadiene-styrene graft copolymer (g-ABS) prepared by grafting a mixture of 30 wt % of styrene and 10 wt % of acrylonitrile to 60 wt % of a polybutadiene rubber having an average particle diameter of 250 nm is used.

(D) Aromatic Vinyl Copolymer Resin

A styrene-acrylonitrile copolymer (SAN) resin having a weight average molecular weight Mw of 160,000 g/mol and containing styrene and acrylonitrile in a weight ratio of 70:30 is used.

(E) Halogen Compound 2,4,6-tris(2,4,6-tribromophenoxy)-1,3,5-triazine (Manufacturer:ICL-IP, Product Name:FR-245) is used.

(F) Phosphoric Ester Compound

Bisphenol-A diphosphate (Manufacturer:Moris, Product Name:BDP) is used.

Examples 1 to 12 and Comparative Examples 1 to 12

The aforementioned components are mixed in amounts as listed in Tables 1 to 4, followed by adding additives, as needed, and extruded at 250° C., thereby preparing a thermoplastic resin composition in pellet form. Here, extrusion is performed using a twin-screw extruder (L/D: 36, Φ: 45 mm). The prepared pellets are dried at 80° C. to 100° C. for 4 hours or more and then subjected to injection molding using a 6 oz. injection machine (molding temperature of 250° C., a mold temperature: 60° C.), thereby preparing a specimen. The prepared specimen is evaluated as to the following properties. Results are shown in Tables 1 and 2.

Property Evaluation (1) Impact resistance: Notched Izod impact strength (unit: kgf·cm/cm) is measured on a ⅛" thick Izod specimen in accordance with ASTM D256.

(2) Flame retardancy:Flame retardancy is measured on a 1.5 mm thick specimen and a 2.0 mm thick specimen by the UL-94 vertical test.

(3) Heat resistance:Vicat softening temperature (VST) (unit: ° C.) is measured at a heating rate of 50° C./hr under a load of 5 kgf in accordance with ISO R306.

(4) Thermal stability: Gas generation is confirmed with the naked eye after leaving specimens each having a size of 5 cm×20 cm×0.2 cm in an injection machine at 250° C. for 10 minutes, and scores (sum of gas trace scores, unit:point) are calculated with respect to the specimens in accordance with the following standard. A lower score indicates better thermal stability.

(Generation of no gas: 0 points, Generation of gas in a length of less than 0.5 cm in the longitudinal direction of a gas trace: 1 point, Generation of gas in a length of 0.5 cm to 1 cm in the longitudinal direction of a gas trace: 2 points, Generation of gas in a length of greater than 1 cm in the longitudinal direction of a gas trace: 3 points)

(5) Fluidity: Melt-flow Index (MI) (unit: g/min) is measured at 220° C. under a load of 10 kgf in accordance with ASTM D1238.

TABLE 1

| | Example | | | | | |
|---|---|---|---|---|---|---|
| | 1 | 2 | 3 | 4 | 5 | 6 |
| (A) (wt %) | 40 | 40 | 40 | 45 | 45 | 45 |
| (B) (wt %) | 4 | 6 | 8 | 4 | 6 | 8 |
| (C) (wt %) | 12 | 10 | 8 | 12 | 10 | 8 |
| (B):(C) (weight ratio) | 1:3 | 1:2 | 1:1 | 1:3 | 1:2 | 1:1 |
| (D) (wt %) | 44 | 44 | 44 | 39 | 39 | 39 |
| (E) (parts by weight) | 8 | 8 | 8 | 8 | 8 | 8 |
| (F) (parts by weight) | 15 | 15 | 15 | 15 | 15 | 15 |
| (E):(F) (weight ratio) | 1:1.88 | 1:1.88 | 1:1.88 | 1:1.88 | 1:1.88 | 1:1.88 |
| IZ (kgf · cm/cm) | 25 | 26 | 27 | 29 | 30 | 31 |
| MI (g/10 min) | 37.9 | 38.3 | 38.1 | 36.0 | 36.2 | 36.2 |
| VST (° C.) | 90.3 | 90.4 | 90.7 | 92 | 92 | 92 |
| Gas generation (point) | 0 | 0 | 0 | 0 | 0 | 0 |
| Flame retardancy 1.5 mm | V-0 | V-0 | V-0 | V-0 | V-0 | V-0 |
| Flame retardancy 2.0 mm | 5VB | 5VB | 5VB | 5VB | 5VB | 5VB |

*parts by weight: parts by weight relative to 100 parts by weight of a thermoplastic resin (A + B + C + D)

TABLE 2

| | Example | | | | | |
|---|---|---|---|---|---|---|
| | 7 | 8 | 9 | 10 | 11 | 12 |
| (A) (wt %) | 50 | 50 | 50 | 40 | 45 | 50 |
| (B) (wt %) | 4 | 6 | 8 | 6 | 6 | 6 |
| (C) (wt %) | 12 | 10 | 8 | 12 | 12 | 12 |
| (B):(C) (weight ratio) | 1:3 | 1:2 | 1:1 | 1:2 | 1:2 | 1:2 |
| (D) (wt %) | 34 | 34 | 34 | 42 | 37 | 32 |
| (E) (parts by weight) | 8 | 8 | 8 | 11 | 11 | 11 |
| (F) (parts by weight) | 15 | 15 | 15 | 10 | 10 | 10 |
| (E):(F) (weight ratio) | 1:1.88 | 1:1.88 | 1:1.88 | 1:0.91 | 1:0.91 | 1:0.91 |
| IZ (kgf · cm/cm) | 32 | 34 | 35 | 28 | 31 | 36 |
| MI (g/10 min) | 32.8 | 33.1 | 33.5 | 30.7 | 29.8 | 27.9 |
| VST (° C.) | 93.5 | 94.5 | 94.5 | 91.5 | 92.5 | 95.7 |
| Gas generation (point) | 0 | 0 | 0 | 0 | 0 | 0 |
| Flame retardancy 1.5 mm | V-0 | V-0 | V-0 | V-0 | V-0 | V-0 |
| Flame retardancy 2.0 mm | 5VB | 5VB | 5VB | 5VB | 5VB | 5VB |

*parts by weight: parts by weight relative to 100 parts by weight of a thermoplastic resin (A + B + C + D)

TABLE 3

| | Comparative Example | | | | | |
|---|---|---|---|---|---|---|
| | 1 | 2 | 3 | 4 | 5 | 6 |
| (A) (wt %) | 60 | 40 | 40 | 40 | 40 | 40 |
| (B) (wt %) | 4 | 0 | 16 | 10 | 2.5 | 4 |
| (C) (wt %) | 12 | 16 | 0 | 6 | 13.5 | 12 |
| (B):(C) (weight ratio) | 1:3 | — | — | 1:0.6 | 1:5.4 | 1:3 |
| (D) (wt %) | 24 | 44 | 44 | 44 | 44 | 44 |
| (E) (parts by weight) | 8 | 8 | 8 | 8 | 8 | 0 |
| (F) (parts by weight) | 15 | 15 | 15 | 15 | 15 | 15 |
| (E):(F) (weight ratio) | 1:1.88 | 1:1.88 | 1:1.88 | 1:1.88 | 1:1.88 | — |
| IZ (kgf · cm/cm) | 45 | 18.5 | 21 | 23.5 | 19 | 37 |
| MI (g/10 min) | 21.2 | 38.2 | 33.4 | 27 | 39.2 | 30.1 |
| VST (° C.) | 93.7 | 90.4 | 90.5 | 95.9 | 96.2 | 95.7 |
| Gas generation (point) | 0 | 0 | 0 | 0 | 0 | 0 |
| Flame retardancy 1.5 mm | V-0 | V-0 | Fail | V-1 | V-0 | Fail |
| Flame retardancy 2.0 mm | 5VB | 5VB | 5VB fail | 5VB fail | 5VB | 5VB fail |

*parts by weight: parts by weight relative to 100 parts by weight of a thermoplastic resin (A + B + C + D)

TABLE 4

| | Comparative Example | | | | | |
|---|---|---|---|---|---|---|
| | 7 | 8 | 9 | 10 | 11 | 12 |
| (A) (wt %) | 40 | 40 | 40 | 40 | 40 | 40 |
| (B) (wt %) | 4 | 4 | 4 | 4 | 4 | 4 |
| (C) (wt %) | 12 | 12 | 12 | 12 | 12 | 12 |
| (B):(C) (weight ratio) | 1:3 | 1:3 | 1:3 | 1:3 | 1:3 | 1:3 |
| (D) (wt %) | 44 | 44 | 44 | 44 | 44 | 44 |
| (E) (parts by weight) | 8 | 16 | 5.2 | 14 | 8 | 11 |
| (F) (parts by weight) | 0 | 0 | 9.8 | 12.7 | 18 | 7.5 |
| (E):(F) (weight ratio) | — | — | 1:1.88 | 1:0.91 | 1:2.25 | 1:0.68 |
| IZ (kgf · cm/cm) | 52 | 15 | 28 | 26 | 20 | 27 |
| MI (g/10 min) | 19.3 | 30 | 33.2 | 35 | 39 | 34 |
| VST (° C.) | 102.1 | 88 | 91.6 | 90.5 | 88.0 | 90.6 |
| Gas generation (point) | 0 | 10 | 0 | 3 | 0 | 3 |
| Flame retardancy 1.5 mm | Fail | V-0 | Fail | V-0 | V-0 | V-0 |
| Flame retardancy 2.0 mm | 5VB fail | 5VB | 5VB fail | 5VB | 5VB | 5VB |

*parts by weight: parts by weight relative to 100 parts by weight of a thermoplastic resin (A + B + C + D)

From the results, it can be seen that the thermoplastic resin compositions according to the present disclosure exhibit good properties in terms of impact resistance, flame retardancy, heat resistance, thermal stability, fluidity (formability), and balance therebetween.

In contrast, the thermoplastic resin composition of Comparative Example 1 prepared using an excess of the polycarbonate resin exhibits deterioration in fluidity; the thermoplastic resin composition of Comparative Example 2 prepared without using the first rubber-modified aromatic vinyl graft copolymer exhibits deterioration in impact resistance; and the thermoplastic resin composition of Comparative Example 3 prepared without using the second rubber-modified aromatic vinyl graft copolymer exhibits deterioration in impact resistance and flame retardancy. In addition, the thermoplastic resin compositions of Comparative Examples 4 and 5 prepared using the first and second rubber-modified aromatic vinyl graft copolymers mixed in a weight ratio out of the range of the present invention exhibit deterioration in impact resistance and/or flame retardancy; the thermoplastic resin composition of Comparative Example 6 prepared without using the halogen compound exhibits deterioration in flame retardancy; and the thermoplastic resin composition of Comparative Example 7 prepared without using the phosphoric ester compound exhibits deterioration in fluidity and flame retardancy. The thermoplastic resin composition of Comparative Example 8 prepared using a higher amount of the halogen compound to secure flame retardancy without using the phosphoric ester compound exhibits deterioration in impact resistance, heat resistance and thermal stability. The thermoplastic resin compositions of Comparative Examples 9 and 10 prepared using the halogen compound and the phosphoric ester compound in a weight ratio of 1:1.875 to 1:0.91, in which the content of the halogen compound is not in the range of the present disclosure, exhibit deterioration in thermal stability and/or flame retardancy. The thermoplastic resin compositions of Comparative Examples 11 and 12 prepared using the halogen compound and the phosphoric ester compound in a weight ratio out of the range of 1:1.875 to 1:0.91 exhibit deterioration in impact resistance, heat resistance and/or thermal stability.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a thermoplastic resin comprising about 35 wt % to about 55 wt % of a polycarbonate resin, about 3 wt % to about 9 wt % of a first rubber-modified aromatic vinyl graft copolymer, about 7 wt % to about 13 wt % of a second rubber-modified aromatic vinyl graft copolymer, and about 30 wt % to about 50 wt % of an aromatic vinyl copolymer resin;
   about 6 to about 13 parts by weight of a halogen compound; and
   about 8 to about 17 parts by weight of a phosphoric ester compound,
   wherein the first rubber-modified aromatic vinyl graft copolymer is a graft copolymer obtained by graft copolymerization of an alkyl (meth)acrylate, an aromatic vinyl monomer and a copolymerizable monomer to a rubber polymer,
   the second rubber-modified aromatic vinyl graft copolymer is a graft copolymer obtained by graft copolymerization of an aromatic vinyl monomer and a copolymerizable monomer to a rubber polymer, and
   the first rubber-modified aromatic vinyl graft copolymer and the second rubber-modified aromatic vinyl graft copolymer are present in a weight ratio of about 1:1 to about 1:4,
   wherein the thermoplastic resin composition has a notched Izod impact strength of about 22 kgf·cm/cm to about 40 kgf·cm/cm, as measured on a ⅛" thick specimen in accordance with ASTM D256 and a flame retardancy of V-0 and a flame retardancy of 5VB, as measured on a 1.5 mm thick specimen and a 2.0 mm thick specimen by a UL-94 vertical test, respectively.

2. The thermoplastic resin composition according to claim 1, wherein the aromatic vinyl copolymer resin is a polymer of a monomer mixture comprising an aromatic vinyl monomer and a vinyl cyanide monomer.

3. The thermoplastic resin composition according to claim 1, wherein the halogen compound comprises decabromodiphenylethane, decabromodiphenylether, tetrabromobisphenol A, tetrabromobisphenol A-epoxy oligomer, brominated epoxy oligomer, octabromomethylphenyl indene, ethylenebistetrabromophthalimide, and/or 2,4,6-tris(2,4,6-tribromophenoxy)-1,3,5-triazine.

4. The thermoplastic resin composition according to claim 1, wherein the phosphoric ester compound comprises a compound represented by Formula 1:

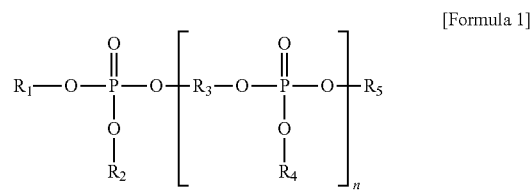

[Formula 1]

wherein $R_1$, $R_2$, $R_4$ and $R_5$ are each independently a hydrogen atom, a $C_6$ to $C_{20}$ aryl group, or a $C_1$ to $C_{10}$ alkyl-substituted $C_6$ to $C_{20}$ aryl group, $R_3$ is a $C_6$ to $C_{20}$ arylene group or a $C_1$ to $C_{10}$ alkyl-substituted $C_6$ to $C_{20}$ arylene group, and n is an integer of 0 to 10.

5. The thermoplastic resin composition according to claim 1, wherein the halogen compound and the phosphoric ester compound are present in a weight ratio of about 1:0.8 to about 1:2.

6. The thermoplastic resin composition according to claim 1, wherein the thermoplastic resin composition has a notched Izod impact strength of about 22 kgf·cm/cm to about 40 kgf·cm/cm, as measured on a ⅛" thick specimen in accordance with ASTM D256.

7. The thermoplastic resin composition according to claim 1, wherein the thermoplastic resin composition has a flame retardancy of V-0 and a flame retardancy of 5VB, as measured on a 1.5 mm thick specimen and a 2.0 mm thick specimen by a UL-94 vertical test, respectively.

8. The thermoplastic resin composition according to claim 1, wherein the thermoplastic resin composition has a Vicat softening temperature of about 90° C. to about 97° C., as measured at a heating rate of 50° C./hr under a load of 5 kgf in accordance with ISO R306.

9. The thermoplastic resin composition according to claim 1, wherein the thermoplastic resin composition has a melt-flow index (MI) of about 26 g/10 min to about 40 g/10 min, as measured at 220° C. under a load of 10 kgf in accordance with ASTM D1238.

10. The thermoplastic resin composition according to claim 1, wherein the thermoplastic resin composition has a Vicat softening temperature of about 90° C. to about 97° C., as measured at a heating rate of 50° C./hr under a load of 5 kgf in accordance with ISO R306.

11. The thermoplastic resin composition according to claim 1, wherein the thermoplastic resin composition has a melt-flow index (MI) of about 26 g/10 min to about 40 g/10 min, as measured at 220° C. under a load of 10 kgf in accordance with ASTM D1238.

12. A molded article formed of the thermoplastic resin composition according to claim 1.

* * * * *